May 22, 1928. 1,670,670
C. F. SMITH
APPARATUS FOR MEASURING PRESSURES
Filed June 5, 1924    2 Sheets-Sheet 1
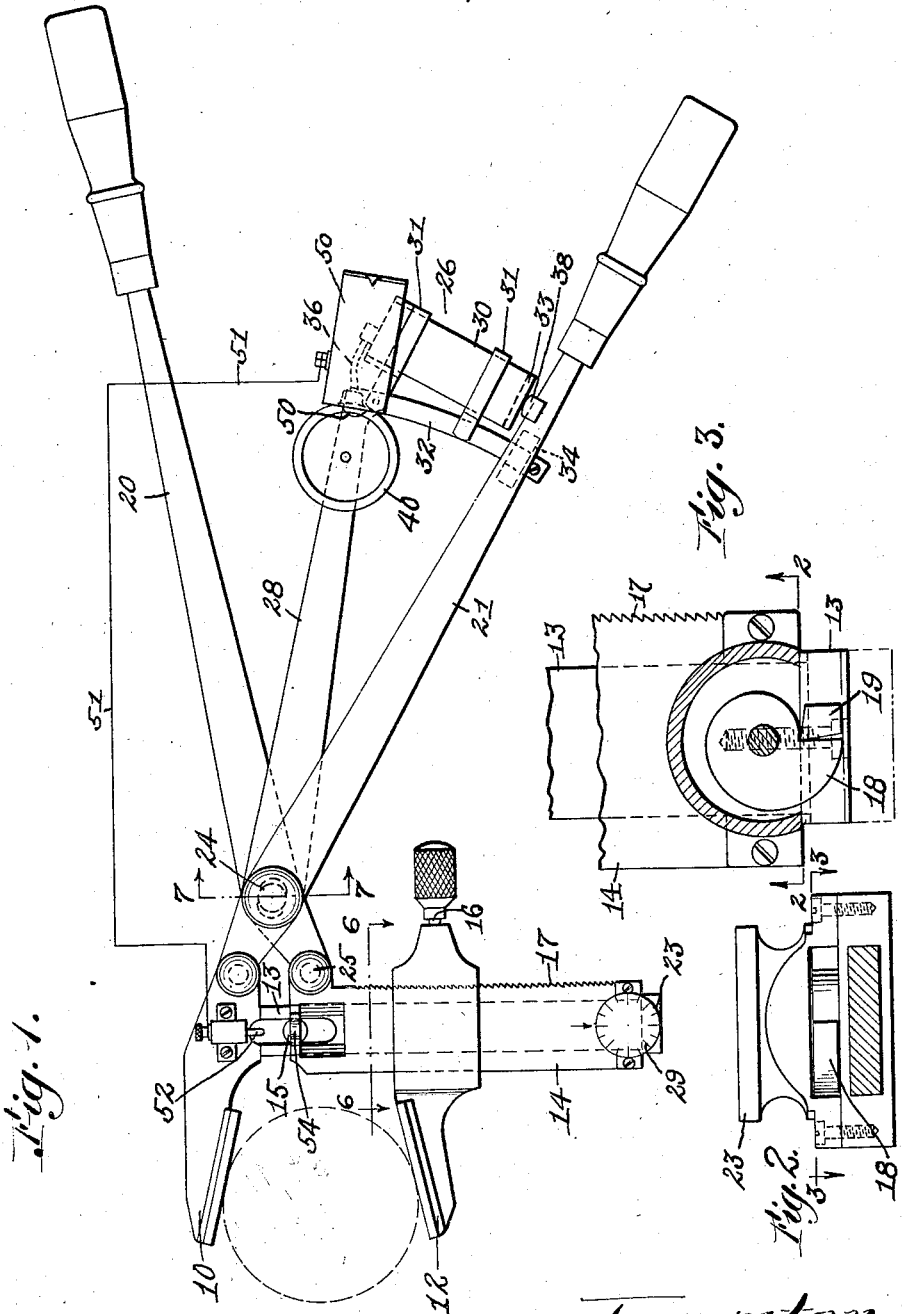
Inventor:
Charles F. Smith
by Jas. H. Churchill
Atty.

May 22, 1928.
C. F. SMITH
1,670,670
APPARATUS FOR MEASURING PRESSURES
Filed June 5, 1924        2 Sheets-Sheet 2
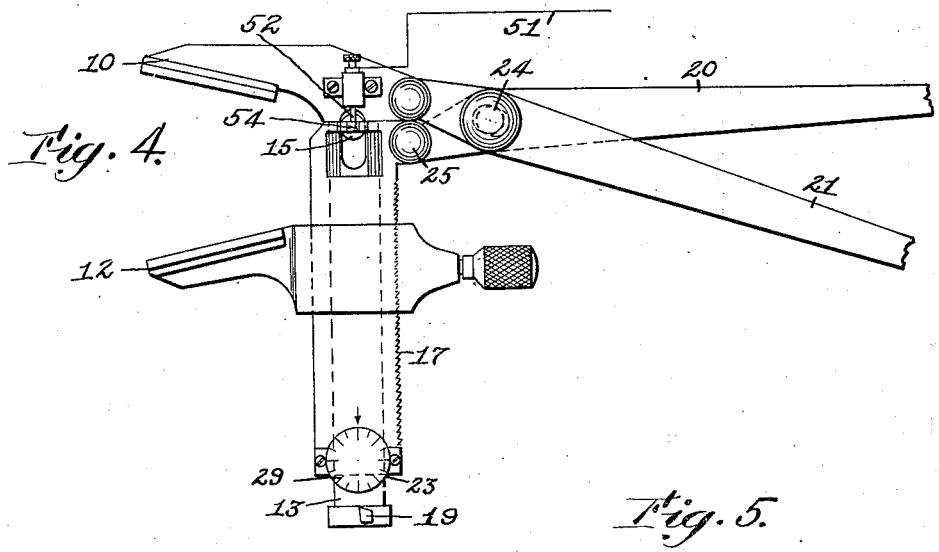
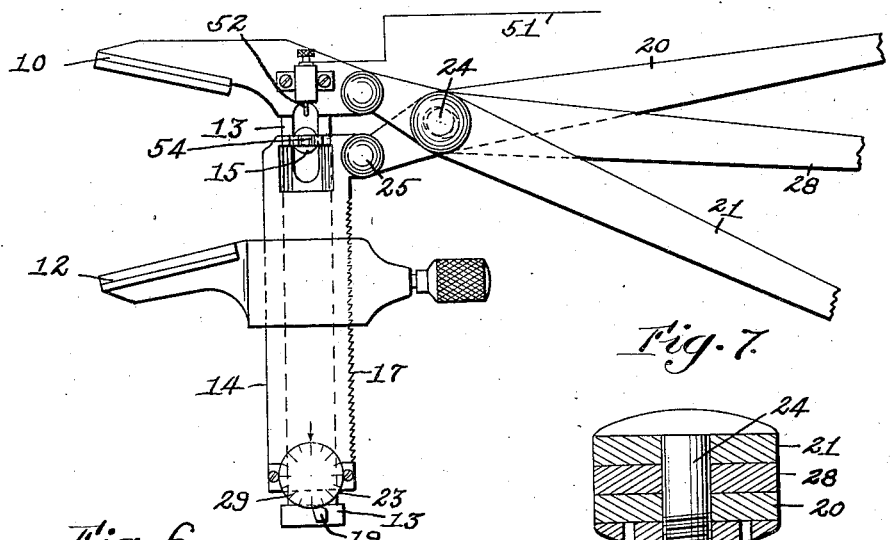
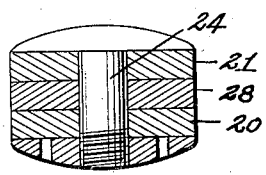
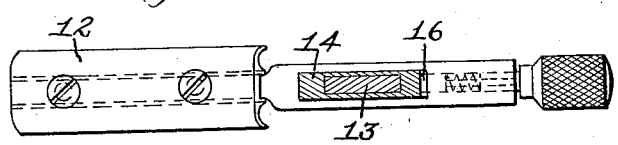
Inventor:
Charles F. Smith
by Jas. H. Churchill
atty.

Patented May 22, 1928.

1,670,670

UNITED STATES PATENT OFFICE.

CHARLES F. SMITH, OF BOSTON, MASSACHUSETTS.

APPARATUS FOR MEASURING PRESSURES.

Application filed June 5, 1924. Serial No. 718,008.

This invention relates to apparatus for measuring the pressure within a flexible container by an instrument applied to the exterior thereof, and more particularly to a tire gauge for measuring the pressure within the tire by an instrument applied to the exterior of the tire itself.

The object of the invention is to provide novel apparatus of the character specified by which the pressure within a flexible container may be measured in a simple and highly convenient manner. A further object of the invention is to provide a novel tire gauge of the character specified which has provision for illuminating the gauge to visibly indicate the registered pressure, and which is therefore particularly adapted for use in garages to enable the operator to efficiently gauge the inflation of a large number of tires of the motor vehicles stored in the garage.

To these ends the apparatus is provided with means for engaging and compressing the exterior of a flexible container, the pressure within which it is desired to measure, and also with means for registering the resistance offered by the container to compression. Provision is made for indicating when the container has been compressed a definite amount in order that a comparison may be obtained between the properly calibrated registered resistance and a predetermined pressure represented by said definite compression.

In its preferred form, the invention is embodied in a tire gauge and provision is made for adjustably varying the amount of the definite compression above referred to, and the adjustment is calibrated against known pressures within tires of the different sizes so that the operator may make the adjustment for a given size of tire and then by compressing a tire of a size corresponding to such adjustment until the indication is given that the definite compression has taken place, he may obtain from the calibrated registered resistance the pressure within the tire. The indication that the definite compression has taken place is preferably obtained by illuminating at such time the resistance registering mechanism.

These and other features of the invention will be hereinafter described and particularly pointed out in the claims at the end of this specification.

In the drawings illustrating the preferred embodiment of the invention, Fig. 1 is a plan of the improved tire gauge illustrating the manner in which the same is applied to a motor vehicle tire; Fig. 2 is a sectional detail on line 2—2 of Fig. 3; Fig. 3 is a sectional detail on line 3—3 of Fig. 2; Fig. 4 is a plan of a portion of the gauge illustrating the position assumed by the parts after the tire has been compressed; Fig. 5 is a similar view illustrating the parts before the tire has been compressed; and Figs. 6 and 7 are details in section taken upon the lines 6—6 and 7—7 of Fig. 1.

Referring to the drawings, the improved measuring apparatus as illustrated therein is embodied in a tire gauge comprising two jaws 10, 12 for engaging the exterior of a tire in the manner illustrated in Fig. 1 and one of which jaws is arranged to be movable with relation to the other. The jaws 10, 12 are preferably provided with relatively inclined faces adapted to engage the side walls of the tire. As herein shown, the stationary jaw 10 is provided with a bar 13 comprising a guide upon which a carrier member 14 is slidably mounted to be capable of movement toward and away from the stationary jaw 10. The carrier member 14 is provided with a roller 15 which frictionally engages the sides of a slot in the guide bar 13. The movable jaw 12 may and preferably will be adjustably mounted upon the carrier member 14 to be capable of adjustment longitudinally thereof, and is held in its adjusted positions by the cooperation of a spring pressed locking dog 16 with one of the teeth 17 upon the side of the carrier member 14, as illustrated in Figs. 1 and 6.

The jaws 10, 12 are arranged to be moved toward and away from one another by levers 20, 21, pivotally mounted upon a common stud 24. The movement of the carrier member 14 away from the stationary jaw 10 is adjustably limited by the cooperation of a cam 18 with a stop 19 upon the end of the guide bar 13. The cam 18 is arranged to be adjustably moved by a knurled nut 23 to permit the total extent of movement of the carrier member to be adjustably varied. The lever 20 is pivotally connected to the carrier member 14 on stud 25 and the lever 21 is connected to the stationary jaw 10 through a pressure registering mechanism indicated generally as 26 and through a lever

28, also pivoted upon the stud 24, and having its end pivotally connected to the stationary jaw 10.

The pressure registering mechanism 26 may and preferably will comprise a cylinder 30 mounted in brackets 31 carried by a bar 32 affixed to the end of the lever 28. The bar 32 is arranged to slide in a bracket 34 on the underside of the lever 21. The pressure cylinder 30 is provided with a piston 33 therein, adapted to be engaged and actuated by a contact member 38 affixed upon the lever 21, and in practice the piston may comprise one end of a hollow metallic bellows of known construction, the second end of which is affixed to the cylinder 30. The piston 33 comprising the first end of the bellows is adapted to be engaged by the contact member 38, so that upon movement of the lever 21, the contact member 38 engages and moves the piston 33, compressing the air or other fluid within the bellows. Provision is made for registering the pressure of the air thus compressed, and for this purpose the cylinder 30 is connected by a connecting pipe 36 to a pressure registering gauge 40 of any usual or preferred construction and which is illustrated as affixed upon the lever 28, to be carried thereby, so that in the use of the measuring instrument, when the levers 20, 21 are manually moved together to compress the portion of the tire between the jaws 10, 12, the resistance offered by the tire to compression is transmitted through the levers 20, 28 which are directly connected to the jaws 10, 12, to the piston 33 of the bellows within the cylinder 30, and consequently to the pressure gauge 40, registering upon the gauge the measure of the resistance offered by the tire to compression.

The pressure gauge 40 may and preferably will be calibrated against standard pressures within tires so as to record this resistance in units of pressure corresponding to the pressure to which a tire is inflated. Provision is made for illuminating the pressure registering gauge 40 when the movable carrier member 14 in its movement toward the stationary jaw 10 reaches a predetermined point, and for this purpose an illuminating device comprising, preferably a flash light 50 may and preferably will be mounted upon the end of the lever 28 in position to direct its rays over the face of the gauge 40. The flash light may be operatively connected through wiring 51 to a contact member 52 comprising a spring pressed yieldable plunger mounted upon the stationary jaw 10. The movable carrier member 14 may be provided with a contact member 54 which is adapted to engage with the contact member 52 when the carrier member 14 arrives at the predetermined point in its movement toward the stationary jaw 10, and to thereby complete the circuit to operate the flash light, thus illuminating the dial or face of the pressure registering gauge 40. The plunger 52 and contact member 54 constitute a switch. The circuit is completed from the contact member 54 through the arm 28 back to the casing 50 of the flashlight, the casing 50 being connected in the usual manner to the usual battery (not shown) within the flashlight casing. The extent of this predetermined movement of the carrier member 14 is arranged to correspond to the proper inflation of a tire of a given size, and when the carrier member reaches the point in its movement toward the stationary jaw 10 at which the gauge is illuminated, the operator may readily note the pressure registered on the gauge 40, and by comparing the registered pressure with that pressure which corresponds to the predetermined movement of the carrier member 14, he is advised that the tire being gauged is either above, below, or possesses the proper inflation, and also as to the amount of air pressure which should be added to or taken from the tire to restore it to a properly inflated condition.

In the preferred embodiment of the invention provision is made for adjustably varying the possible extent of movement of the carrier member 14 toward the stationary jaw, in order that the carrier member may have a total possible movement from its extreme open position until the lighting circuit is closed between the contact members 52, 54, corresponding to different sizes of tires. In practice this is preferably accomplished by means of the cam 18 arranged to cooperate with the stop 19 on the end of the guide bar 13 to limit the outward movement of the carrier member 14. The cam 18 is, as has been stated, operated by a knurled nut 23 and the apparatus is calibrated against known pressures in different sizes of tires so as to determine different positions of the cam corresponding to different predetermined amounts of compression in the tires of the different sizes. In order that the operator may conveniently adjust the cam, a scale 29 indicating tire sizes is preferably provided upon the top of the knurled nut 23 as indicated in Figs. 1, 4, and 5. In the operation of the apparatus, the operator first adjusts the cam 18 to a position in which the carrier member 14 may have the requisite movement until the lighting circuit is closed corresponding to the proper amount of compression so that the pressure registering gauge may give a reading of the true pressure within the tire of that particular size. Then the operator applies the jaws 10, 12 to the tire in the manner illustrated in Fig. 1, adjusting the jaw 12 upon the carrier member 14 until it engages the side of the tire. The operator then compresses the tire by manually moving the ends of the levers 20, 21 together until the flash light 50 is lighted upon closure of the lighting circuit between the contacts 52, 54. When the lamp is thus lighted the operator reads the pressure upon the gauge and this pressure is the pressure within the tire. In the event that the pressure within the tire is above or below the desired amount, he may reduce or increase the pressure in the usual way by manipulation of the usual air valve. In the garage the operator may gauge all the tires of a given size with a single adjustment of the cam 18, and then in the event that he desires to gauge tires of different sizes, he may adjust the cam to a position corresponding to the size of the next set of tires to be gauged.

From the description thus far, it will be observed that in accordance with the present invention an instrument is provided for enabling the operator to conveniently and rapidly measure the inflation of motor vehicle tires by an instrument applied to the outside of the tire. This is particularly useful in garage work where the cars are stored close together and it is only with difficulty and inconvenience that the operator may apply the ordinary form of pressure gauge to the tire valve. By means of the present instrument, the operator may quickly gauge or test the inflation of the tires from the front and rear of the vehicles, and the fact that the pressure gauge itself is illuminated assists materially in the convenience of using the instrument at night or in garages having poor lighting facilities. While the preferred embodiment of the invention has been illustrated and described, it is to be understood that the invention may be embodied in other forms within the scope of the following claims.

I claim—

1. Apparatus of the character described comprising a pair of relatively movable members for engaging a flexible container to be tested, means for relatively moving said members to compress a portion of the container, pressure registering means co-operating with said members to be actuated by the resistance to movement of said members offered by said flexible container, and means for illuminating said pressure registering means controlled by said movable members and operated thereby when a predetermined point is reached in the relative movement of said members toward each other.

2. Apparatus of the character described comprising means applicable to the exterior of a flexible container for compressing a portion of the same, pressure registering means co-operating with said members to be actuated thereby for registering the resistance offered by the container to compression by said members, and means for illuminating said pressure registering means controlled by said movable members and operated thereby when a predetermined point has been reached in the compression of said container.

3. Apparatus of the character described comprising means applicable to the exterior of a flexible container for compressing a portion of the same, pressure registering means operatively connected therewith to be actuated thereby when the resistance of the container reaches a predetermined point, and means co-operating with said compressing means for indicating a predetermined compression in said container.

4. A pressure gauge for tires comprising jaws capable of engaging the side walls of a tire mounted on a rim, means for moving said jaws toward each other to compress said tire, and means co-operating with said jaw-moving means and rendered effective by the latter to indicate a predetermined compression in said tire.

5. A pressure gauge for tires comprising a pair of relatively movable tire engaging members, means for relatively moving said members to compress a portion of a tire between them, means actuated by said members for registering the resistance offered by the tire to compression, an electric lamp adapted to illuminate said registering means and electrical connections between the lamp and compressing members and actuated by the latter for lighting the lamp at a predetermined point in the relative movement of said compressing members.

6. A pressure gauge for tires comprising means applicable to the exterior of the tire for compressing a portion of the same, including a tire engaging member having a guide bar, a movable tire engaging member, a carrier member arranged to slide upon said guide bar and upon which said movable tire engaging member is mounted, levers for moving the carrier member toward and away from the stationary tire engaging member, and a pressure registering device co-operating with said tire-engaging members to be actuated thereby for registering the resistance offered to compression of said tire by said members.

7. A pressure gauge for tires comprising means applicable to the exterior of the tire for compressing a portion of the same, including a tire engaging member having a guide bar connected therewith, a movable tire engaging member, a carrier member arranged to slide upon said guide member, and upon which said tire engaging member is mounted, levers for moving the carrier member toward the first-mentioned tire engaging member, a pressure registering device co-operating with said tire-engaging members to be actuated thereby for registering the resistance offered to compression by the tire, and means for illuminating the pressure registering device rendered operative by a predetermined movement of said carrier member.

8. A pressure gauge for tires comprising means applicable to the exterior of the tire for compressing a portion of the same, including a tire engaging member, having a guide bar connected therewith, a second tire engaging member, a carrier member arranged to slide upon said guide member and upon which the second tire engaging member is mounted, means for moving the carrier member toward the first tire engaging member to effect a compression of the tire, a pressure registering device co-operating with said tire-engaging members to be actuated thereby for registering the resistance offered by the tire to compression, means for illuminating the pressure registering device upon predetermined movement of the carrier member, and means for adjustably limiting the possible extent of movement of the carrier member.

9. A pressure gauge for tires comprising means applicable to the exterior of the tire for compressing a portion of the same, pressure registering means connected therewith to be actuated thereby for registering the resistance of the tire to compression, and means controlled by said compressing means for illuminating the pressure registering means when the tire has been compressed a predetermined amount, and means for adjusting the point at which such illumination occurs.

10. In an apparatus of the character described, jaws for engaging a yielding container, one of which is movable toward the other, levers carrying said jaws, a gauge carried by said levers, an hydraulic cylinder connected with said gauge and responsive to pressure between said jaws, and means for indicating a predetermined movement of said movable jaws to thereby obtain a comparison of a predetermined pressure represented by said movement with the pressure in the container.

11. In an apparatus of the character described, jaws for engaging a yielding container, one of which is movable toward the other, levers carrying said jaws, a gauge carried by said levers, an hydraulic cylinder connected with said gauge and responsive to pressure between said jaws, an electric light for illuminating said gauge, and a circuit controller for said electric light operated by said movable jaw.

12. In an apparatus of the character described, jaws for engaging a yielding container, means for moving one of said jaws toward the other to indicate pressure in said container, and means co-operating with said movable jaw for indicating when the movable jaw has been moved a predetermined distance to thereby obtain a comparison of a predetermined pressure represented by said movement with the pressure in the container.

13. Apparatus of the character described comprising two relatively movable members for engaging the exterior of a flexible container and compressing the same, supporting members upon which the said engaging members are mounted, registering means co-operating with said members to be actuated thereby for registering the resistance offered by the container to compression, means co-operating with said movable members for indicating a predetermined compression in the container, and means for adjusting the position of one of said engaging members upon its supporting member.

In testimony whereof, I have signed my name to this specification.

CHARLES F. SMITH.